(12) United States Patent
Fusari et al.

(10) Patent No.: US 9,340,256 B2
(45) Date of Patent: May 17, 2016

(54) BICYCLE ELECTRONIC SYSTEM

(71) Applicant: CAMPAGNOLO S.r.L., Vicenza (IT)

(72) Inventors: Flavio Fusari, Vicenza (IT); Flavio Cracco, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/290,646

(22) Filed: May 29, 2014

(65) Prior Publication Data

US 2014/0358385 A1    Dec. 4, 2014

(30) Foreign Application Priority Data

May 31, 2013   (IT) .............................. MI2013A0895

(51) Int. Cl.
| | |
|---|---|
| B62M 25/08 | (2006.01) |
| B62M 9/122 | (2010.01) |
| B62M 9/132 | (2010.01) |

(52) U.S. Cl.
CPC ............... *B62M 9/122* (2013.01); *B62M 9/132* (2013.01); *B62M 25/08* (2013.01)

(58) Field of Classification Search
None
See application file for complete search history.

(56) References Cited

U.S. PATENT DOCUMENTS

| | | | |
|---|---|---|---|
| 5,213,548 A | 5/1993 | Colbert et al. | |
| 6,741,045 B2 | 5/2004 | Kitamura | |
| 6,757,567 B2 | 6/2004 | Campagnolo | |
| 8,402,664 B1 | 3/2013 | Kitamura et al. | |
| 2005/0187049 A1 | 8/2005 | Guderzo et al. | |
| 2005/0195094 A1 | 9/2005 | White | |
| 2008/0312799 A1 | 12/2008 | Miglioranza | |
| 2011/0267178 A1* | 11/2011 | Nishihara et al. | .......... 340/12.39 |
| 2012/0053804 A1* | 3/2012 | Saida et al. | ..................... 701/70 |
| 2012/0159328 A1 | 6/2012 | Millington et al. | |
| 2012/0252544 A1 | 10/2012 | Yuen | |
| 2013/0027052 A1 | 1/2013 | Matsumoto et al. | |
| 2013/0030603 A1* | 1/2013 | Hashimoto et al. | ............... 701/1 |
| 2013/0061705 A1 | 3/2013 | Jordan | |
| 2014/0277637 A1 | 9/2014 | Ventura et al. | |

FOREIGN PATENT DOCUMENTS

| | | |
|---|---|---|
| EP | 2399813 A1 | 12/2011 |
| EP | 2072091 B1 | 2/2012 |
| WO | 2010131983 A1 | 11/2010 |
| WO | 2011026137 A1 | 3/2011 |
| WO | 2011/039723 A1 | 4/2011 |

OTHER PUBLICATIONS

References cited in a Non-Final Office Action dated Nov. 4, 2015, issued in related U.S. Appl. No. 14/290,681.
References cited in a Non-Final Office Action dated Dec. 4, 2015, issued in related U.S. Appl. No. 14/290,734.

\* cited by examiner

*Primary Examiner* — Justin Holmes
(74) *Attorney, Agent, or Firm* — Volpe and Koenig, P.C.

(57) ABSTRACT

The present invention relates to a bicycle electronic system, comprising:
  a battery unit,
  a manual command management unit,
  a derailleur management unit, and
  a supply and communication bus, each of said units being connected to said bus,
wherein each of said manual command management unit and derailleur management unit comprises a processor and a voltage regulator arranged between the processor and said bus.

15 Claims, 5 Drawing Sheets

BICYCLE ELECTRONIC SYSTEM

CROSS REFERENCE TO RELATED APPLICATION

This application claims the benefit of Italian Application No. MI2013A000895, which was filed on May 31, 2013, and is incorporated herein by reference as if fully set forth.

FIELD OF THE INVENTION

The present invention relates to a bicycle electronic system and in particular a bicycle electronic gearshift.

BACKGROUND

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur are provided for. In the case of an electronically servo-assisted gearshift, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any moving part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or, of particular interest for the present invention, the gear ratio is changed based on commands manually input by the cyclist through suitable control members, for example levers and/or buttons.

A device for controlling the front derailleur and a device for controlling the rear derailleur—or just one of the two in the case of simpler gearshifts—are mounted so as to be easy for the cyclist to manoeuvre, normally on the handlebars, close to the handgrips thereof where the brake lever is also located for controlling the front and rear wheel brake, respectively. Control devices that allow to drive both a derailleur in the two directions and a brake are commonly called integrated controls.

By convention, the device for controlling the front derailleur and the brake lever of the front wheel are located close to the left handgrip, and vice-versa the device for controlling the rear derailleur and the brake lever of the rear wheel are located close to the right handgrip.

The aforementioned components are located on-board the bicycle and must communicate with one another. Moreover, the aforementioned components must be powered.

U.S. Pat. No. 6,741,045 B2 discloses a bicycle control apparatus comprising a bicycle component control unit having one of a control transmitter and a control receiver; a computer control unit having the other one of the control transmitter and the control receiver; a transmission path coupled to the bicycle component control unit and to the computer control unit; wherein the control transmitter communicates power and data to the control receiver on the transmission path.

U.S. Pat. No. 6,757,567 B2 discloses an electronic control system for cycles for association with a set of sensors, a set of actuators and a set of control members associated with the cycle, comprising: a first processor unit able to act as a unit for processing and displaying information; a second processor unit able to act as a unit for controlling the communication and interfacing with said set of control members; and a third processor unit able to act as a unit for interfacing with said set of sensor and said set of actuators; said first, second and third processor unit being connected together via asynchronous bi-directional communication channels.

EP 2 072 091 B1 discloses a bicycle electronic apparatus comprising an electronic control unit, a display unit, a drive unit and a second electronic control unit or sensor unit that communicate via a communication channel through a suitable communication protocol; a line for powering the components of the bicycle electronic apparatus is also provided.

The Applicant has perceived that the architectures of the aforementioned documents generally comprise a main processor, the malfunctioning of which results in the entire system malfunctioning.

The problem at the basis of the invention is therefore that of avoiding the aforementioned drawbacks, in particular providing a bicycle electronic system having a distributed architecture.

SUMMARY

In one aspect thereof, the present invention relates to a bicycle electronic system, comprising:
 a battery unit,
 a manual command management unit,
 a derailleur management unit, and
 a supply and communication bus, each of said units being connected to said bus.

Each of said manual command management unit and derailleur management unit comprises a processor and a voltage regulator arranged between the processor and said bus.

Such a distributed architecture makes it possible to avoid a central processing unit, as well as to easily expand the system. Moreover, the power supply is advantageously shared by all of the units, each advantageously being provided with a voltage regulator to adapt it to its processor that can therefore be specific for the unit itself. The manual command management unit communicates with the derailleur management unit through the bus to impart gearshifting commands thereto. Vice-versa, the derailleur management unit can communicate messages relative to its own state directly to the manual command management unit.

This embodiment of the bicycle electronic system can be further improved through the following additional features capable to be combined together as desired.

Advantageously, said supply and communication bus comprises a ground cable, a power supply cable and a single serial communication cable.

By providing for a bus with three wires distributed over the entire system, the connections of the various units are simplified.

Preferably, each of said manual command management unit and derailleur management unit comprises a receiver incorporated within said processor or external thereto and/or a transmitter.

By providing for both the transmitter and the receiver on each unit, the capabilities of the system are increased.

Preferably, said transmitter and said receiver are connected to said serial communication cable.

Preferably, each of said manual command management unit and derailleur management unit further comprises a capacitive device arranged between the regulator and power supply and ground cables of said bus.

Said capacitive device advantageously has the function of allowing the power supply to the processor for a brief time sufficient for saving data in the case of a lack of power supply.

Preferably, each of said manual command management unit and derailleur management unit and optionally said battery unit comprises a polarizer, preferably a resistor, arranged between power supply and communication cables of said bus.

Advantageously, the system further comprises a second manual command management unit and a second derailleur management unit, each comprising a processor and a voltage regulator arranged between the processor and ground and power supply cables of said bus.

Advantageously, the system further comprises at least one other unit selected from the group consisting of a computer cycle, a sensor unit, a logging unit, a peripheral unit, each comprising a processor and a voltage regulator arranged between the processor and ground and power supply cables of said bus.

Preferably, said transmitter comprises a MOSFET and a resistor connected in series between the communication and ground cables of the bus, the gate of the MOSFET being driven by the processor.

Preferably, the receiver comprises a threshold comparator, more preferably a Schmitt trigger.

Preferably, the processor is configured to check, through the receiver, that the voltage on the communication cable is equal to a quiescence value for a minimum time and transmit a message, through the transmitter, only in the affirmative case.

Preferably, the processor is configured to check, through the receiver, every bit transmitted through the transmitter and to retransmit the entire message and/or the single transmitted bit in case the check gives a negative outcome.

Preferably, the processor is configured to monitor, through the receiver, whether the voltage on the communication cable is equal to a quiescence value for a minimum time and, in the negative case, to receive a message, to check whether it is the receiving unit, and, in the positive case, to send an acknowledgement of receipt signal through the transmitter, to carry out a possible action in response to the message, and to send a further acknowledgement of receipt signal through the transmitter.

BRIEF DESCRIPTION OF THE DRAWINGS

Further features and advantages of the present invention will become clearer from the following detailed description of some preferred embodiments thereof, made with reference to the attached drawings. The different features in the individual configurations can be combined together as desired. In such drawings

DETAILED DESCRIPTION OF THE PREFERRED EMBODIMENTS

Figure 1:
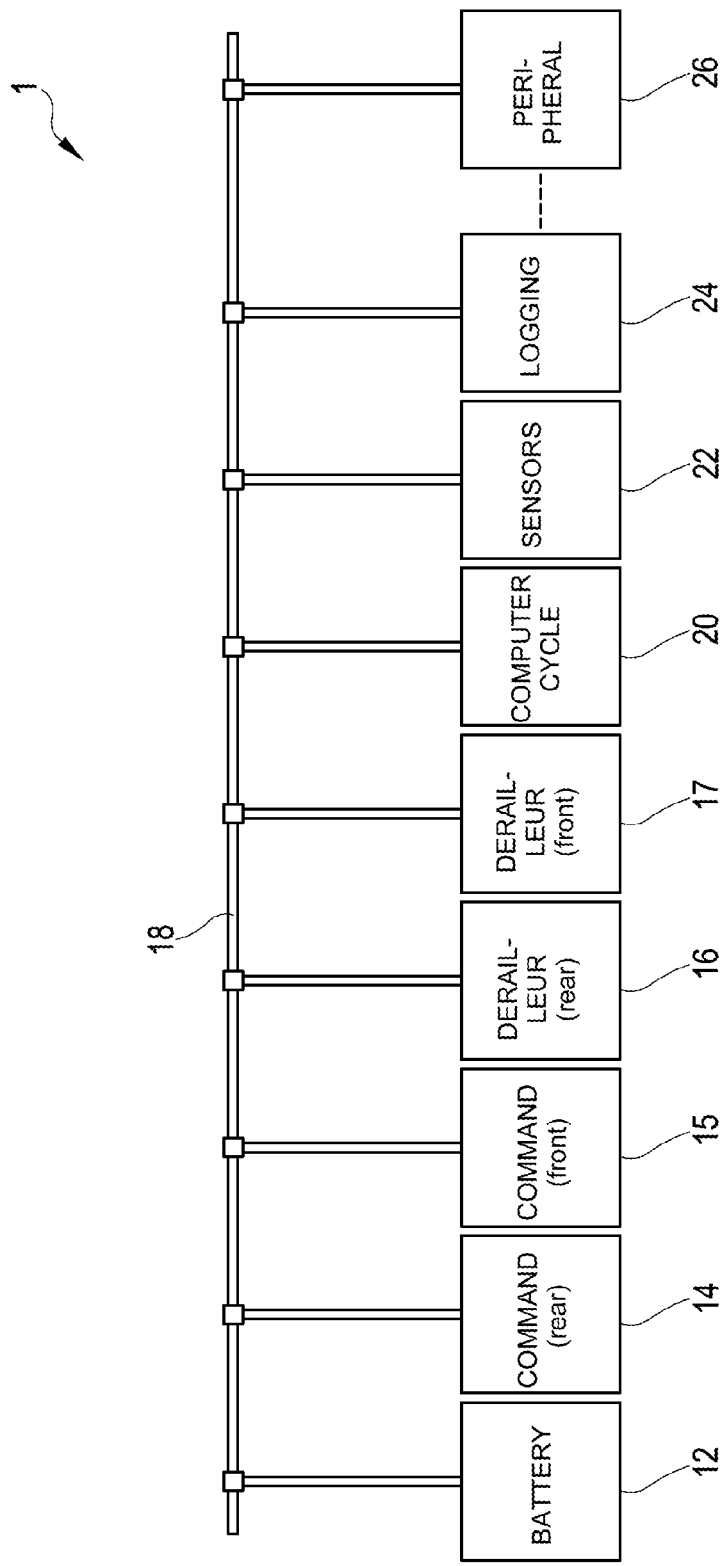
FIG. 1 is a block diagram of a bicycle electronic system according to an embodiment of the present invention.

In the following description, for the illustration of the figures, identical or similar reference numerals are used to indicate constructive elements with the same or analogous function.

With reference to FIG. 1, a bicycle electronic system 1 comprises a battery unit 12, a manual command management unit 14, a derailleur management unit 16, and a bus 18 or power supply and communication bus. Each of said units 12, 14, 16 is connected to the bus 18.

For example, the manual command management unit 14 is the one actuated with the right hand and the derailleur management unit 16 is the one associated with the rear wheel.

Preferably, but not necessarily, the bicycle electronic system 1 further comprises other units connected to the bus 18.

A second manual command management unit 15 and a second derailleur management unit 17 are thus shown, in the above example the one actuated with the left hand and the one associated with the axle of the pedal cranks, respectively.

In an alternative embodiment, there can be just the management unit of the front derailleur and the respective command, typically actuated with the left hand.

Among the other units that can be connected to the bus 18 in the bicycle electronic system 1 there are a computer cycle 20, a sensor unit 22, a logging unit 24, and a generic peripheral unit 26, for example a unit for detecting/processing the pedalling effort, remotely-positioned command units, namely one or more duplicated command units in different positions on the handlebars or elsewhere, etc.

Figure 2:
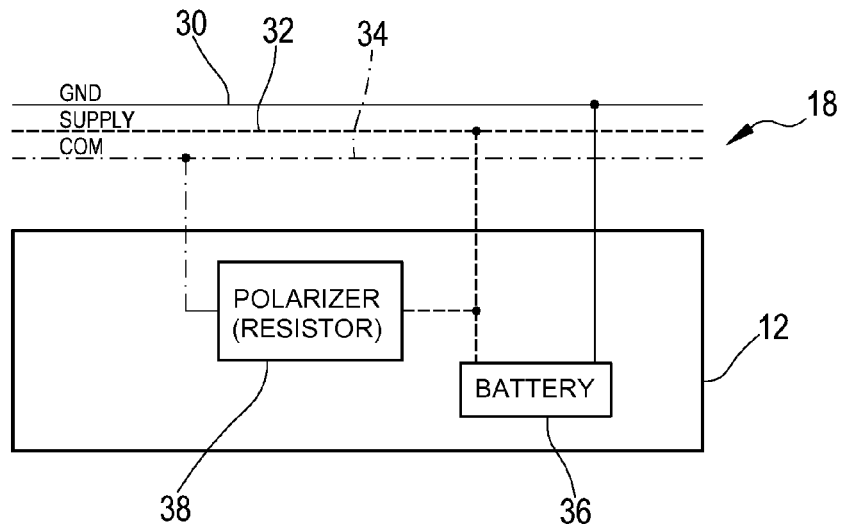
FIG. 2 is a block diagram of a battery unit of the bicycle electronic system.

The bus 18 comprises three cables, as can be seen in FIG. 2, 3: a ground cable 30, a power supply cable 32 and a single serial communication cable 34. The ground cable 30 is the reference for all the differences in electrical potential of the system, the power supply cable 32 feeds all of the units 14-17, 20, 22, 24, 26 connected in the bicycle electronic system 1, and the serial communication cable 34 is used by all of the units 14-17, 20, 22, 24, 26 connected in the bicycle electronic system 1 to communicate service or error messages or commands.

Figure 3:
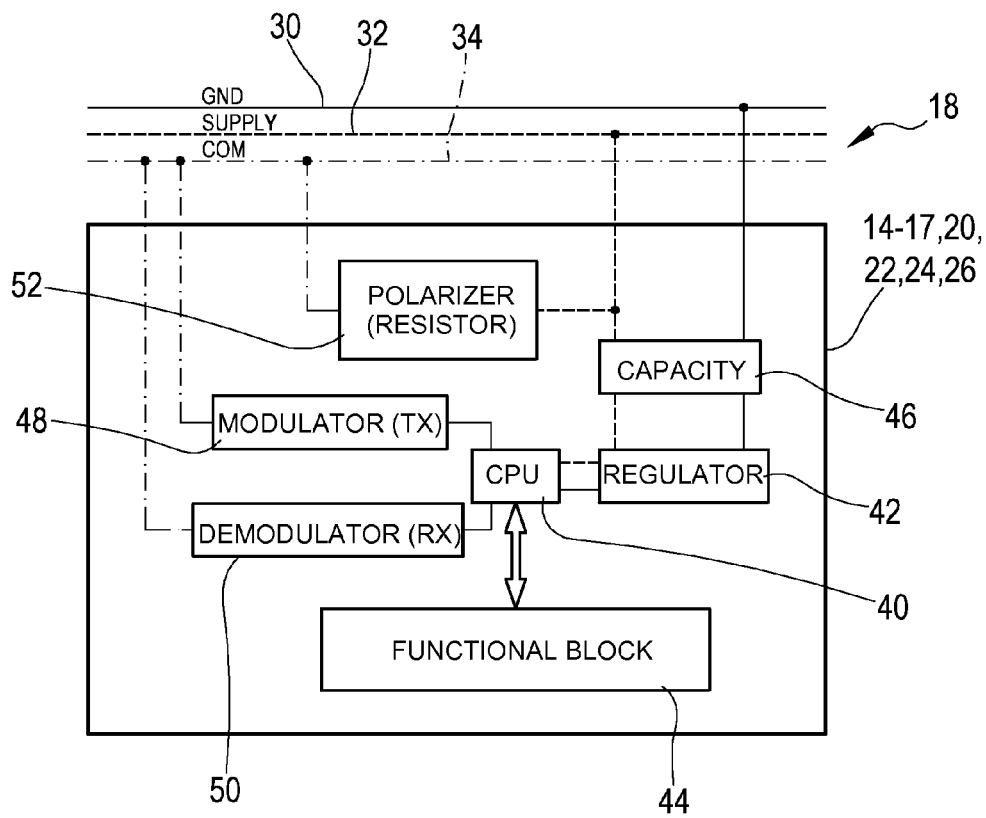
FIG. 3 is a block diagram of each of the other units of the bicycle electronic system.

FIG. 2 also illustrates the block diagram of the battery unit 12, while FIG. 3 also shows the block diagram of each of the other aforementioned units 14-17, 20, 22, 24, 26.

The battery unit 12 comprises a power cell or battery 36 or accumulator, which can also be formed of many cells, preferably rechargeable, typically connected in series. The battery 36 is connected between the ground and power supply cables 30, 32 to supply a voltage difference between the two cables available for the rest of the bicycle electronic system 1 through the bus 18. The battery unit 12 also optionally comprises a polarizer 38, for example a resistor, connected between the power supply cable 32 and the communication cable 34 to generate a known voltage on the communication cable 34.

As shown in FIG. 3, each of the other units 14-17, 20, 22, 24, 26 comprises a processor 40 and a voltage regulator 42 arranged between the processor 40 and the bus 18, more specifically between its ground and power supply cables 30, 32.

The processor 40 controls and/or is controlled by devices specific for the unit 14-17, 20, 22, 24, 26 itself, depicted by a generic functional block 44. For example, in the case of the manual command management unit 14, 15 the functional block 44 typically comprises at least two switches to transmit, when their state is changed, an upward gearshifting request signal and a downward gearshifting request signal, respectively, as well as possibly actuation levers or buttons of the switches; in the case of the derailleur management unit 16, 17, the functional block 44 for example comprises a driving circuit of an electric motor and/or an electric motor for moving the chain guide element of the derailleur; in the case of the computer cycle 20, the functional block 44 for example comprises a display, control switches, a data and program memory; in the case of the sensor unit 22, the functional block 44 comprises one or more sensors of variables such as the travel speed, cadence of rotation of the pedal cranks, the torque applied to the pedal cranks, the slope of the travel terrain, the heart rate of the cyclist and the like; in the case of the logging unit 24, the functional block 44 for example comprises a clock and a memory to store events and the respective times when they occurred; finally, in the case of a generic peripheral unit 26, the functional block 44 comprises one or more electronic devices controlled by or for controlling the processor 40; there could also be peripheral units 26 having just a processing function, without the functional block 44.

The provision of a voltage regulator 42 makes it possible to design each unit 14-17, 20, 22, 24, 26 with the processor 40 most suitable for the specific function of the unit itself, which as can be seen from the above can be highly variable. The voltage regulator 42, indeed, takes the power supplied by the battery 12 from the bus 18 and provides the most suitable voltage values for the processor 40.

Although it has not been shown, one or more of the electronic and electromechanical devices schematised by the functional block 44 can be directly connected to the ground 30 and power supply cables 32 to be supplied by the battery unit 12 through the bus 18.

A capacitive device 46, such as a small-capacity condenser, is preferably arranged between the voltage regulator 42 and the bus 18, more specifically between its ground and power supply cables 30, 32. Such a device has the function of allowing the power supply of the processor 40 for a brief period of time, for example a few milliseconds, sufficient to allow a delayed turning off of the processor 40 in the case of a lack of power supply on the bus 18, so that the processor 40 can take care of saving all the data and the current value of all of the variables in a non-volatile memory in the case of the lack of power supply.

Each unit 14-17, 20, 22, 24, 26 also preferably and advantageously comprises a modulator of the voltage on the communication cable or transmitter 48 and a demodulator of the voltage on the communication cable or receiver 50.

As better described hereinafter, the receiver 50 is shown as a self-standing block, but it can be incorporated in the processor 40.

The provision of a transmitter or modulator 48 and of a receiver or demodulator 50 in each unit connected in the bicycle electronic system 1 allows a direct communication between the various units. In particular, the manual command management units 14, 15 and/or the sensor unit 22 can communicate directly with the derailleur management units 16, 17 to directly impart upward and downward gearshifting commands and receive state messages of the derailleurs. A communication protocol particularly suitable for the bicycle electronic system 1 is illustrated hereinafter.

In some units 14-17, 20, 22, 24, 26 the transmitter 48 and/or the receiver 50 could be absent, of course giving up the ability to communicate (or the full ability) for such units, and possibly changing communication protocol with respect to that described hereinafter.

Similarly to the battery unit 12, each of the other units 14-17, 20, 22, 24, 26 also optionally comprises a polarizer 52, for example a resistor, connected between the power supply cable 32 and the communication cable 34 to generate a known voltage on the communication cable 34.

Figure 4:
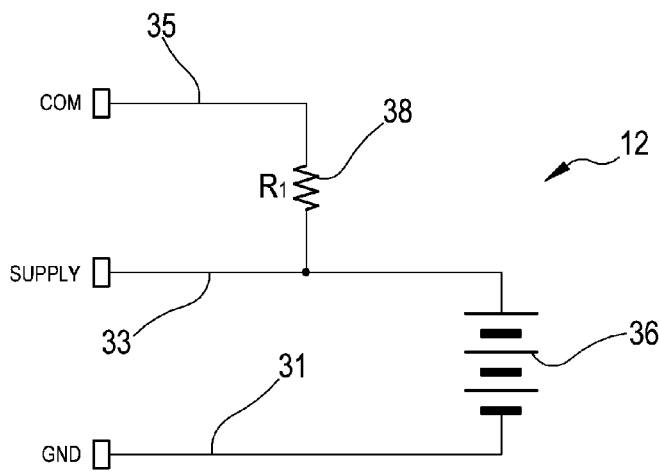
FIG. 4 is a basic wiring diagram of a battery unit of the bicycle electronic system.

FIG. 4 is a basic wiring diagram of the battery unit 12, which better illustrates how the battery 36 or accumulator, formed of plural cells connected in series, is connected between cables 31, 33 leading to the ground and power supply cables 30, 32 of the bus 18 and the optional polarizer 38, in the form of a resistor 38, is connected between cables 33, 35 leading to the power supply cable 32 and to the communication cable 34 of the bus 18.

Figure 5:
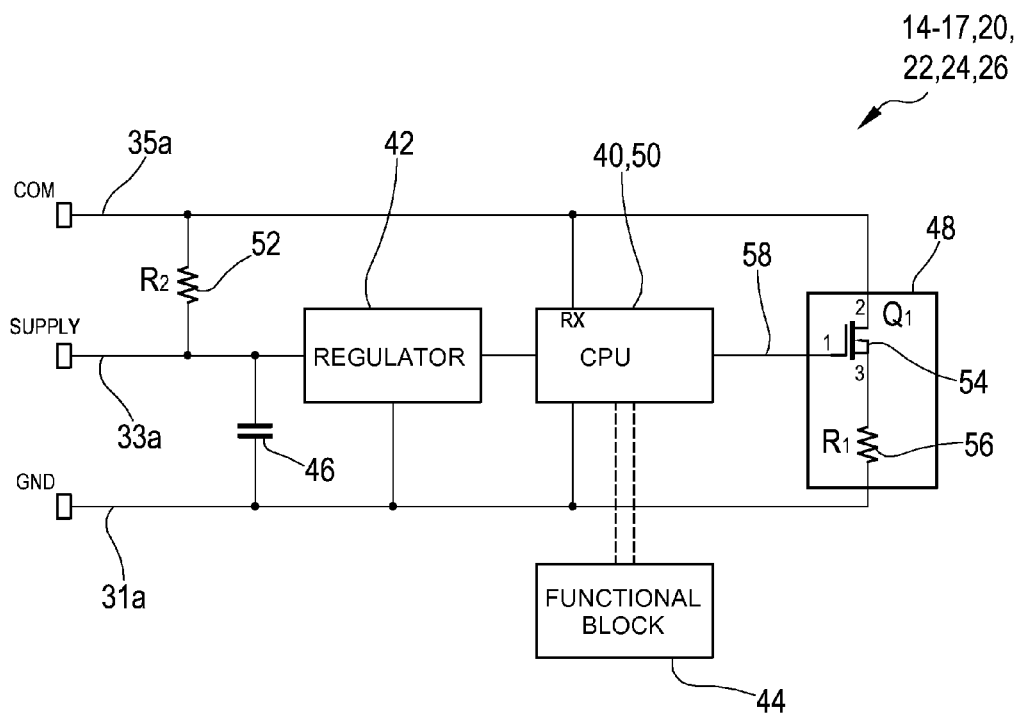
FIG. 5 is a basic wiring diagram of each of the other units of the bicycle electronic system.

FIG. 5 is a basic wiring diagram of each of the other units 14-17, 20, 22, 24, 26 of the bicycle electronic system 1. The protection capacity 46 is connected between cables 31a, 33a leading to the ground and power supply cables 30, 32 of the bus 18; downstream thereof, the voltage regulator 42 is connected between the cables 31a, 33a leading to the power supply and ground cables 32, 30 of the bus 18; the processor 40 is connected between the voltage regulator 42 and the cable 31a leading to the ground cable 30 in such a way as to be powered with a regulated voltage. The processor 40 is also connected directly to a cable 35a leading to the communication cable 34 since it incorporates or implements the receiver 50, being able to detect the voltage level present on the communication cable 34 and to interpret it according to the communication protocol described below.

In an alternative embodiment, the demodulator could be a self-standing component, for example a threshold comparator, preferably a Schmitt trigger.

The modulator or transmitter 48 comprises a MOSFET 54 and a resistor 56 connected in series between the cables 31a and 35a leading to the ground cable 30 and to the communication cable 34 of the bus 18, more specifically the drain of the MOSFET 54 is connected to the cable 35a leading to the communication cable 34, the source of the MOSFET 54 is connected to an end of the resistor 56, and a second end of the resistor 56 is connected to the cable 31a leading to the ground cable 30. The gate of the MOSFET 54 is driven by the processor 40 through a command line 58.

Finally, the polarizer 52 is shown, in the form of a resistor 52, connected between the cables 33a and 35a leading to the power supply and communication cables 32, 34 upstream of all of the devices of the unit 14-17, 20, 22, 24, 26.

When the processor 40 does not apply voltage to the gate of the MOSFET 54, the drain and the source are substantially isolated from one another and the voltage on the communication cable 34 is dictated by the polarizer 52. When the processor 40 applies a voltage to the gate of the MOSFET 54 that is greater than its threshold voltage, an electric current flows through the MOSFET 54 and there is a drop in the voltage on the communication cable 34 through the resistor 56.

The voltage Vbus on the communication cable 34 of the bus 18 then passes from a constant value called quiescence voltage Vq hereinbelow when in any unit a voltage is not applied to the gate of the MOSFET 54—voltage corresponding to a first logic level, for example to a logic 0–, to a value Vtx below Vq when in a unit a voltage is applied to the gate of the MOSFET 54—voltage corresponding to a second logic level, for example to a logic 1. The value of the voltage Vbus on the communication cable 34 of the bus is detected by the demodulator or receiver 50 and translated in a logic level 0 or 1. Through the control over time of the voltage applied to the gate of the MOSFET 54, the processor 40 through the transmitter 48 is therefore able to transmit binary signals on the communication cable 34.

It should be highlighted that some of the blocks shown in FIGS. 2, 3 and some of the components shown in FIGS. 4, 5 can be left out.

Figure 6:
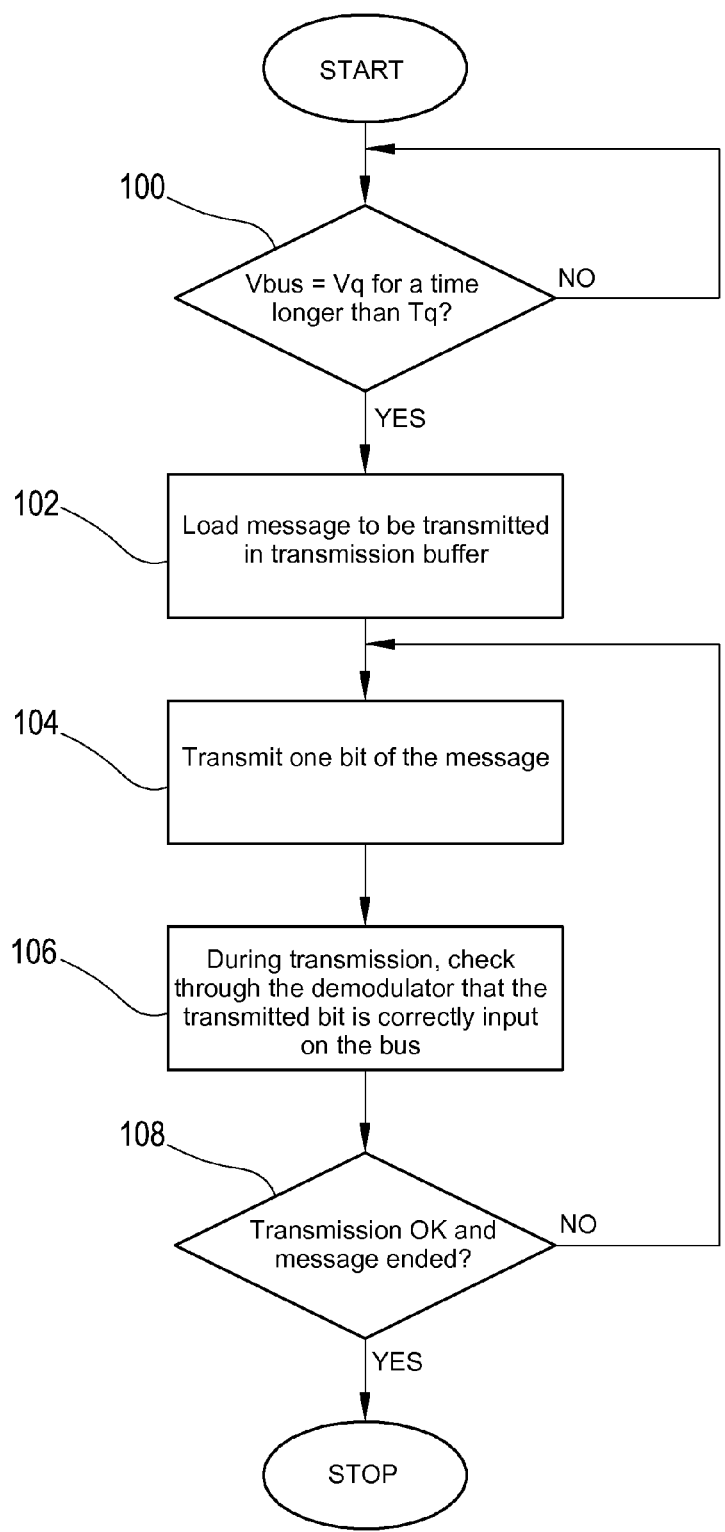
FIG. 6 is a flow chart of a communication protocol, relative to the transmission.
Figure 7:
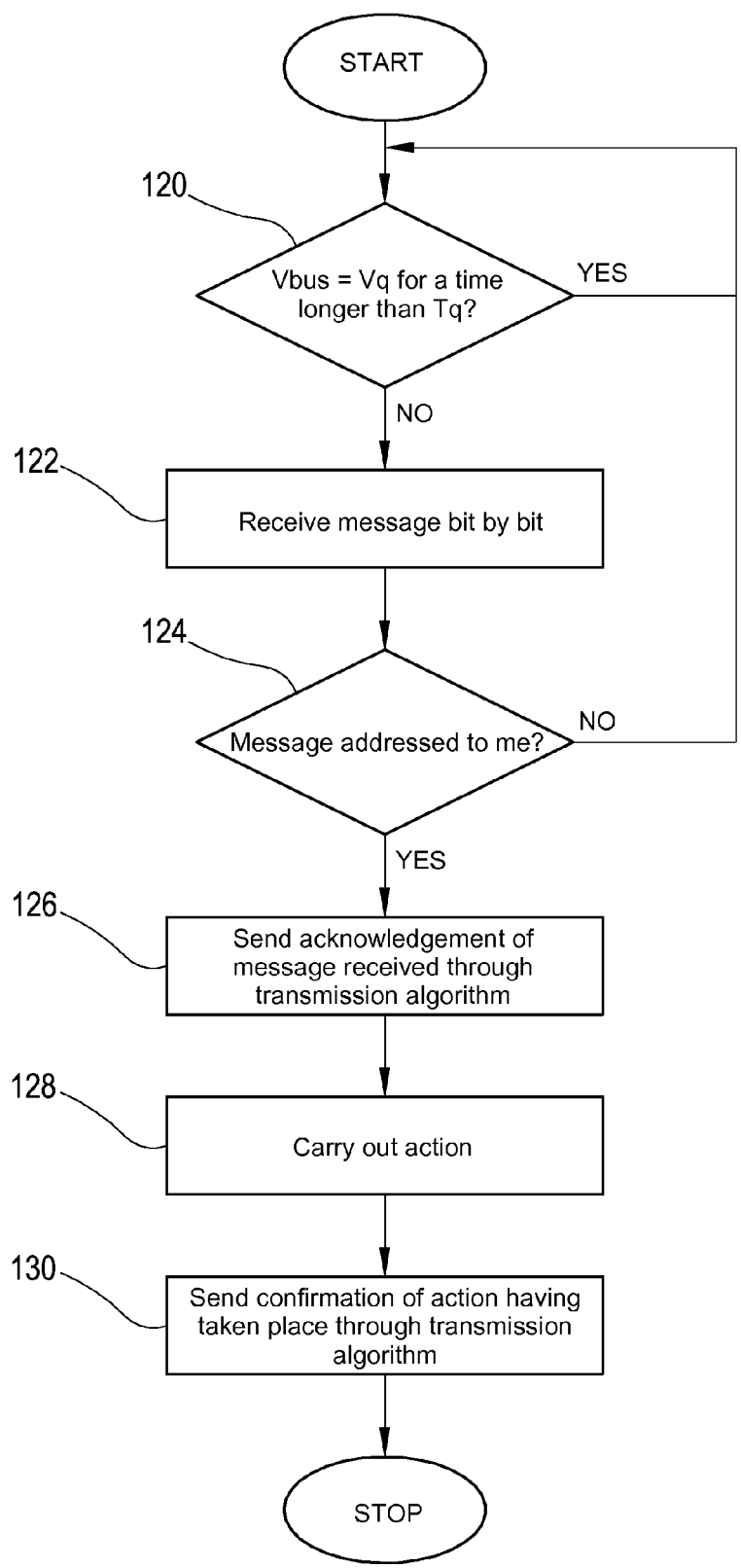
FIG. 7 is a flow chart of the communication protocol, relative to the reception.

FIG. 6 is a flow diagram of a communication protocol according to the invention, relative to transmission and FIG. 7 is a flow diagram of the communication protocol, relative to reception. The communication protocol provides that there is a single transmitting unit at a time and constant listening for reception from all of the units.

As far as transmission is concerned, with reference to FIG. 6, the processor 40 of one unit 14-17, 20, 22, 24, 26 that must transmit a message first checks, in a block 100 and through the receiver 50, that the voltage Vbus on the communication cable 34 is equal to the quiescence value Vq for a minimum time Tq, sized as average time during which on the average no device is using the bus. Tq is a minimum time that ensures that a message will not be interrupted and it can be constant, zero or variable and adapt to the modes of use.

In the negative case, i.e. if the value of the voltage Vbus has decreased to Vtx<Vq, this means that a unit 14-17, 20, 22, 24, 26 (including the unit itself that must transmit the message) already has a transmission under way, for which reason the execution stays in the checking block 100.

In the positive case, i.e. if the value of the voltage Vbus stays equal to Vq for the time period Tq, this means that no unit 14-17, 20, 22, 24, 26 is transmitting and the communication cable 34 is available.

In this case, the processor 40 loads, block 102, the message to be transmitted in a transmission buffer—although the loading can take place before the check of block 100.

The processor 40 then transmits, block 104, the message loaded in the transmission buffer one bit at a time, through the transmitter 48, and checks, block 106, through the receiver 50, that the transmitted bit is correctly loaded on the communication cable 34. In a block 108 the processor 40 checks whether the transmission of the current bit took place correctly, and whether the message to be transmitted has ended. In the negative case, it returns to block 104 to transmit another bit—or to retransmit the same bit or start again to transmit the message in the case of an error, while in the affirmative case the execution of the transmission protocol has ended.

As far as reception is concerned, with reference to FIG. 7, the processor 40 of each unit 14-17, 20, 22, 24, 26 connected in the bicycle electronic system 1 checks, in a block 120 and through the receiver 50, that the voltage Vbus on the communication cable 34 is equal to the quiescence value Vq for the minimum time Tq. So long as this condition is true, no unit 14-17, 20, 22, 24, 26 is transmitting and the processor continues to check the voltage Vbus. This check in reception can however be left out.

When the voltage Vbus is no longer equal to Vq, rather it is equal to Vtx since a unit 14-17, 20, 22, 24, 26 is transmitting, the processor 40 of each unit 14-17, 20, 22, 24, 26 connected in the bicycle electronic system 1 receives, in a block 122 and through the receiver 50, an entire message bit by bit, for example storing it in a receiving buffer.

The processor 40 of each unit 14-17, 20, 22, 24, 26 connected in the bicycle electronic system 1, in a block 124, thus checks whether the message is addressed to the unit 14-17, 20, 22, 24, 26 of which it is part, and in the negative case goes back to checking the voltage Vbus in block 120.

The processor 40 of the receiving unit of the message, in which the check of block 124 has had a positive outcome, transmits, in a block 126, an acknowledgment of message received, through the aforementioned protocol—or through a modified protocol in which it does not wait in block 100 for the bus to be free.

The processor 40 of the receiving unit of the message, in a block 128, optionally carries out an action in response to the message received. For example, in the case of an upward gearshifting request message from the manual command management unit 14, the associated derailleur management unit 16 carries out the upward gearshifting by suitably driving the electric motor for moving the chain guide element of the derailleur.

Thereafter, the processor 40 of the receiving unit of the message transmits, in a block 130, a confirmation of action having taken place, through the aforementioned protocol.

The bicycle electronic system 1 described above has a distributed architecture, wherein a central processing unit is advantageously absent. All of the units 14-17, 20, 22, 24, 26 are at the same level, none is slave or master of others. The bicycle electronic system 1 described above can easily be reconfigured with the addition, the removal or the replacement of units. The provision of a bus 18 having three cables for the entire bicycle electronic system 1 also facilitates the assembly operations with respect to systems wherein the various devices are interconnected with a number of cables variable from point to point in the system.

From the description that has been made, the characteristics of the bicycle electronic system object of the present invention are clear, just as the relative advantages are also clear.

Further variants of the embodiments described above are possible, without departing from the teaching of the invention.

Finally, it is clear that the bicycle electronic system thus conceived is subject to undergo several modifications and variants, all encompassed by the invention; moreover, all of the details can be replaced by technically equivalent elements. In practice, the materials used, as well as the sizes, can be whatever according to the technical requirements.

The invention claimed is:

1. Bicycle electronic system, comprising:
   a battery unit,
   a manual command management unit,
   a derailleur management unit, and
   a supply and communication bus, each of said units being connected to said bus,
   wherein each of said manual command management unit and derailleur management unit comprises a processor and a voltage regulator arranged between the processor and said bus.

2. System according to claim 1, wherein said supply and communication bus comprises a ground cable, a power supply cable and a single serial communication cable.

3. System according to claim 2, wherein each of said manual command management unit and derailleur management unit further comprises at least one of: a receiver, incorporated within said processor or external thereto, and a transmitter.

4. System according to claim 3, wherein said transmitter and said receiver are connected to said serial communication cable.

5. System according to claim 3, wherein said transmitter comprises a metal-oxide-semiconductor field-effect transistor (MOSFET) and a resistor connected in series between the communication and ground cables of the bus, a gate of the MOSFET being driven by the processor.

6. System according to claim 3, wherein said receiver comprises a threshold comparator.

7. System according to claim 6, wherein said threshold comparator comprises a Schmitt trigger.

8. System according to claim 3, wherein the processor is configured to check, through the receiver, that the voltage on the communication cable is equal to a quiescence value for a minimum time and to transmit a message, through the transmitter, only in the affirmative case.

9. System according to claim 3, wherein the processor is configured to check, through the receiver, every bit transmitted through the transmitter and to retransmit at least one of the entire message and the single transmitted bit in case the check gives a negative outcome.

10. System according to claim 3, wherein the processor is configured to monitor, through the receiver, whether the voltage on the communication cable is equal to a quiescence value for a minimum time and, in the negative case, to receive a message, to check whether it is the receiving unit, and, in the positive case, to send an acknowledgement of receipt signal through the transmitter, to carry out a possible action in response to the message, and to send a further acknowledgement of receipt signal through the transmitter.

11. System according to claim 1, wherein each of said manual command management unit and derailleur management unit and optionally said battery unit comprises a polarizer arranged between power supply and communication cables of said bus.

12. System according to claim 11, wherein said polarizer comprises a resistor.

13. System according to claim 1, further comprising a second manual command management unit and a second derailleur management unit, each comprising a processor and a voltage regulator arranged between the processor and a ground cable and a power supply cable of said bus.

14. System according to claim 1, further comprising at least one other unit selected from the group consisting of a computer cycle, a sensor unit, a logging unit, a peripheral unit, each comprising a processor and a voltage regulator arranged between the processor and a ground cable and a power supply cable of said bus.

15. System according to claim 1, wherein each of said manual command management unit and derailleur management unit further comprises a capacitive device arranged between the regulator and a power supply cable and a ground cable of said bus.

* * * * *

UNITED STATES PATENT AND TRADEMARK OFFICE
CERTIFICATE OF CORRECTION

| | |
|---|---|
| PATENT NO. | : 9,340,256 B2 |
| APPLICATION NO. | : 14/290646 |
| DATED | : May 17, 2016 |
| INVENTOR(S) | : Flavio Fusari and Flavio Cracco |

It is certified that error appears in the above-identified patent and that said Letters Patent is hereby corrected as shown below:

IN THE CLAIMS

In Column 9, Line 13, in Claim 9, delete "bit" and insert -- bit, --, therefor.

Signed and Sealed this
Nineteenth Day of July, 2016

Michelle K. Lee
*Director of the United States Patent and Trademark Office*